Dec. 15, 1964    W. MARGOLIN ETAL    3,161,023
VARIABLE SPEED HYDROMECHANICAL POWER TRANSMISSION
Filed Aug. 7, 1962    5 Sheets-Sheet 3

INVENTORS.
William Margolin
Louis J. Haller
Paul O. Pippel
Atty.

Dec. 15, 1964 W. MARGOLIN ETAL 3,161,023
VARIABLE SPEED HYDROMECHANICAL POWER TRANSMISSION
Filed Aug. 7, 1962 5 Sheets-Sheet 4

INVENTORS.
William Margolin
Louis W. Haller
Paul O. Pippel
Atty.

United States Patent Office 3,161,023
Patented Dec. 15, 1964

3,161,023
VARIABLE SPEED HYDROMECHANICAL
POWER TRANSMISSION
William Margolin and Louis G. Haller, Chicago, Ill.,
assignors to International Harvester Company, Chicago, Ill., a corporation of New Jersey
Filed Aug. 7, 1962, Ser. No. 215,307
19 Claims. (Cl. 60—53)

This invention relates to a variable speed power transmission having a multipiston hydraulic pump in drive relation with a multipiston hydraulic motor. More in particular this invention relates to a hydromechanical power transmission having novel independently controlled swash plates.

A hydromechanical power transmission differs from a hydrostatic power transmission in that when the speed of the output shaft equals the speed of the input shaft in the same direction the power transmission is entirely mechanical as the hydraulic components are under hydraulic lock and thus no fluid flow occurs. For other speed ratios the power path is divided, part being hydraulic and the balance being mechanical. Thus when a hydromechanical transmission is initially energized the power train is substantially all hydrostatic but as the output speed increases the proportion of hydrostatic power flow drive decreases progressively until the output speed reaches input speed when the drive path is entirely mechanical. Overdrive and reverse direction of the output are of mixed hydrostatic and mechanical power flow paths.

One of the chief difficulties encountered in hydraulic power transmissions is the ability of the device to attain a neutral position wherein no power is transmitted to the output shaft and thus both shafts being freely rotatable with respect to each other. Because of construction difficulties in most prior designs only one of the two swash plates, either motor or pump, was externally adjustable, the other being at a fixed displacement. Theoretically the adjustable swash plate could be positioned for neutral condition but as a practical matter could not be attained. This means that the output shaft tended to "creep" and thus deliver power at a slow speed. A prime object of this invention is to provide means for selectively adjusting both swash plates for the pump and motor wherein both can be in "float" position thus delivering no power to the output shaft. This is of great importance particularly when such transmission is used in the power train for propelling a vehicle such as an agricultural tractor.

Another difficulty found in prior designs is that a separate multipiston block was required for the pump and motor which not only is expensive but requires larger space. An important object of the present invention is to combine both pump and motor pistons in a single block thereby making the construction less expensive and requiring less space.

A further difficulty observed in prior construction is the inability of shifting the stationary valve member by external means. Prior constructions require dismantling the mechanism to adjust the stationary valve member so that it is in proper phase relation with its associated swash plate. It is thus a further object of this invention to provide external means for adjusting the position of the stationary valve members for properly phasing the valve members with respect to their associated swash plates without dismantling.

Another important object is to eliminate the necessity of employing thrust bearings in the transmission. In prior constructions thrust bearings were required for absorbing axial thrust of the rotatable elements due to hydraulic pressures. An important object of the present invention is to provide fluid pressure means for automatically balancing counter-actively the axial thrust exerted by the rotatable elements thereby eliminating the need for thrust bearings.

These and other desirable and important objects inherent in and encompassed by the invention will be more readily understood from the ensuing description of a preferred embodiment of the invention, the appended claims and the annexed drawings, wherein:

Figure 1:
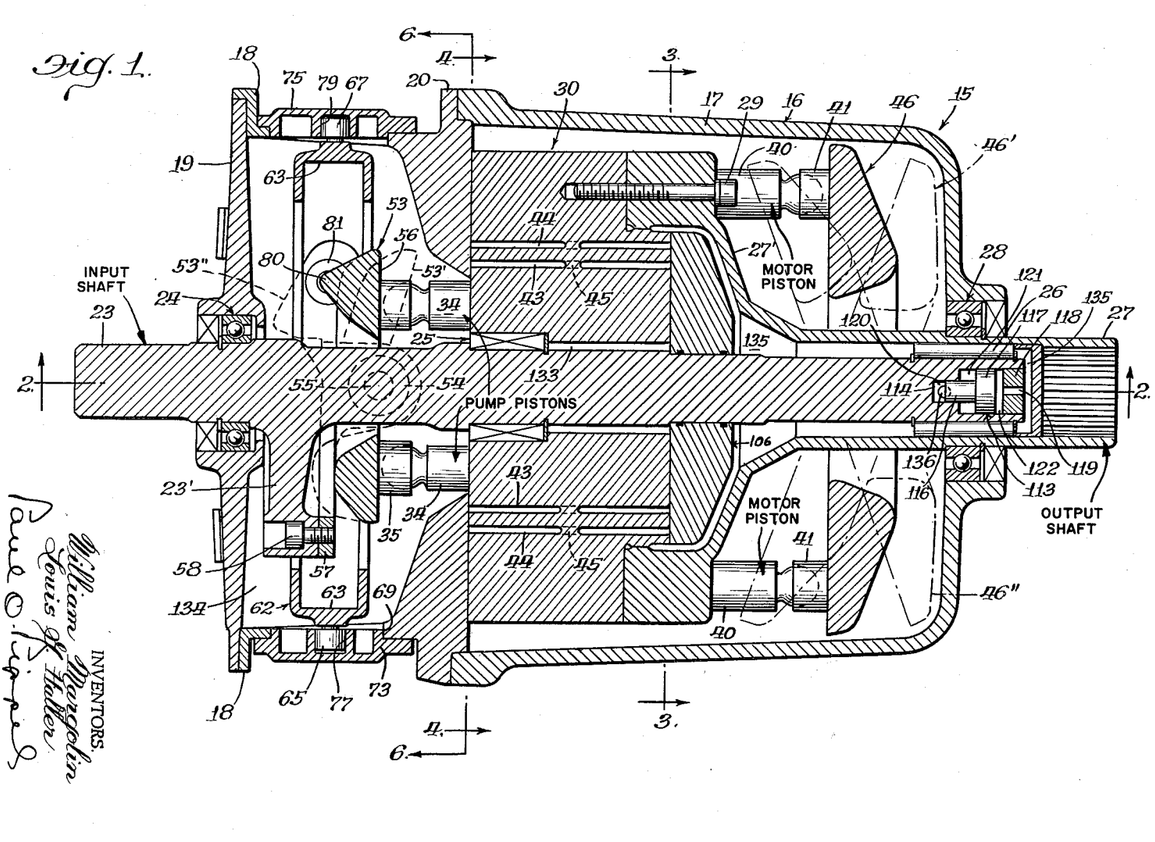
FIGURE 1 is a longitudinal view, in section, taken at right angles to line 1—1 of FIGURE 2, illustrating in assembled form a preferred embodiment of the hydromechanical transmission comprising this invention.
Figure 2:
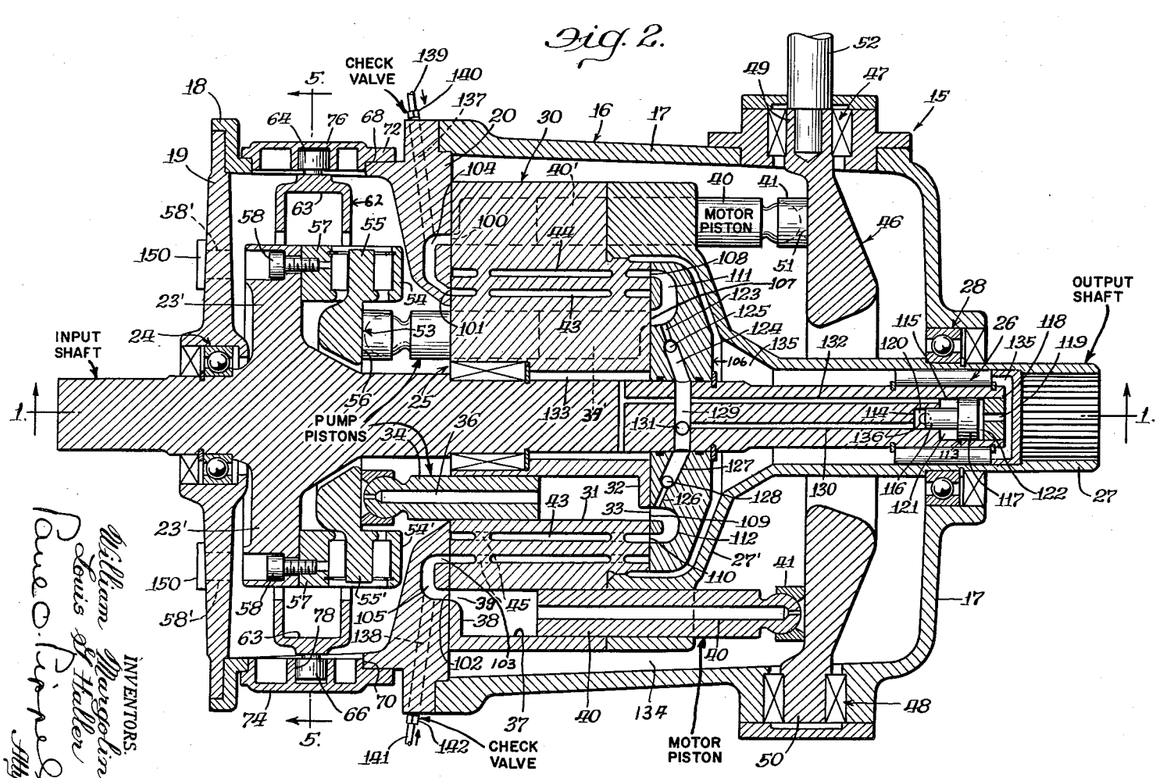
FIGURE 2 is a longitudinal view, partly in section and partly broken away, taken on line 2—2 of FIGURE 1 further illustrating the transmission of FIGURE 1 in assembled form but in a plane perpendicular from that of FIGURE 1.

With continued reference to the drawings it will be seen from FIGURES 1 and 2 the hydromechanical power transmission comprising this invention is indicated generally by the numeral 15. The transmission 15 includes a stationary housing generally indicated at 16. The housing 16 comprises housing elements 17, 18 and 19 as well as the stationary valve member 20 which also serves as a housing element. The housing elements 18 and 19 are connected rigidly together by conventional means such as by a plurality of peripherally disposed longitudinal bolts (not shown). The housing element 18 is also connected rigidly to the stationary valve member 20 by conventional means such as a plurality of peripherally disposed radial bolts (not shown).

Figure 4:
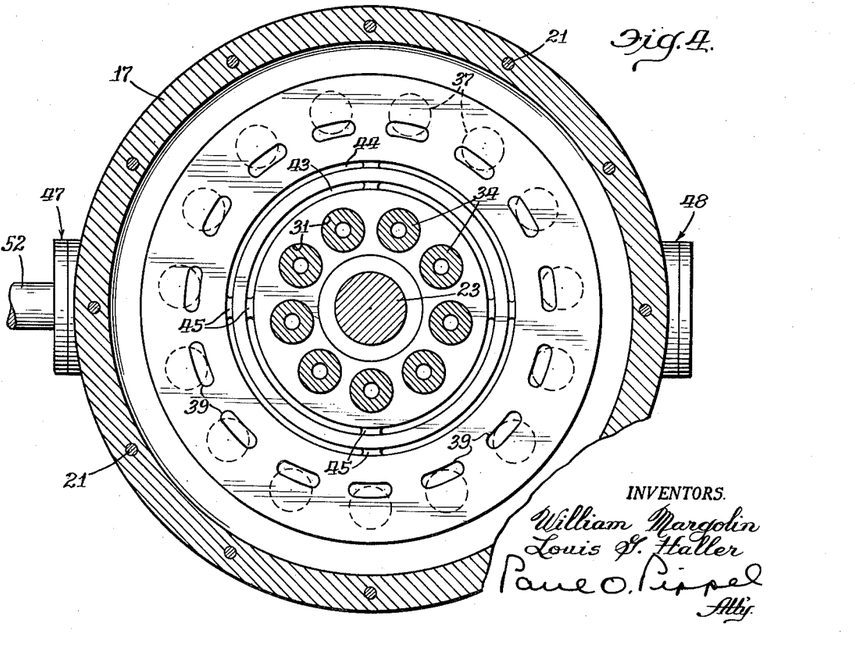
FIGURE 4 is a transverse view partly in section and partly broken away taken on line 4—4 of FIGURE 1 showing further details of the construction of the multipiston carrier member.
Figure 6:
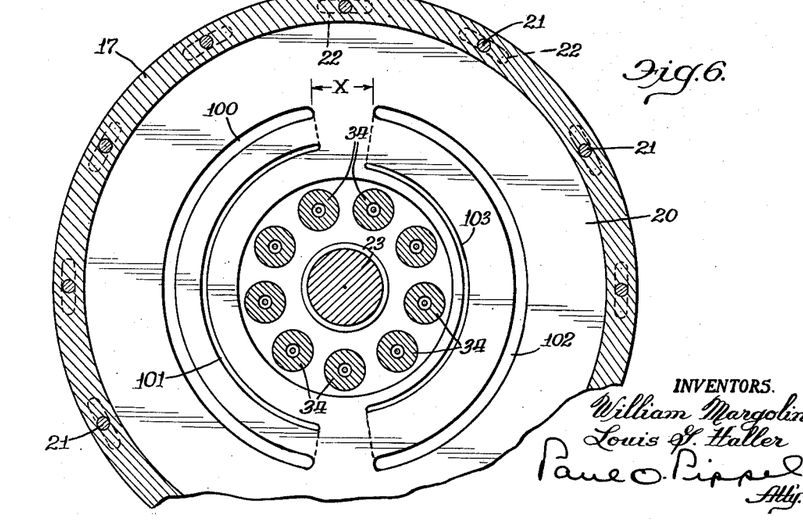
FIGURE 6 is a transverse sectional view, partly broken away, taken on line 6—6 of FIGURE 1 showing the arrangement of fluid ports on the stationary valve element.

The stationary valve member 20, sometimes referred to as a "kidney valve," is rigidly connected to the housing element 17 by a plurality of longitudinal bolts 21 disposed peripherally as best shown in FIGURES 4 and 6. However the stationary valve member 20 may be adjustably rotated a few degrees with the bolts 21 loosened for purposes of ensuring proper valving position as will be explained later herein. Rotative adjustment of the stationary valve member 20 with respect to housing element 17 is accomplished by providing the valve member 20 with a plurality of arcuately shaped elongated holes 22 shown in dotted lines in FIGURE 6. Thus it can be seen that the stationary valve member 20 may be externally adjusted rotatably by merely loosening the bolts 21 and moving the valve member 20 into the desired position, thereafter tightening the bolts 21 to secure the valve member 20 in rigid relation with respect to the housing element 17. This is an important feature of this invention for prior constructions require the dismantling of the transmission to make a corresponding adjustment but in the present construction it can be accomplished externally, simply and conveniently.

From the above it can be seen that the housing 16 in its assembled form is a stationary and rigid structure.

Within the housing 16 is a power input shaft 23 supported rotatably by longitudinally spaced and aligned bearings indicated at 24 and 26 in FIGURES 1 and 2. As viewed in FIGURE 1 the input shaft 23 projects externally of the housing 16 at the left end portion thereof which may be splined for driven engagement with a source of rotative power (not shown) such as an internal combustion engine. Also within the housing 16 is an output shaft 27 which is generally of hollow construction. The output shaft 27 on its inner end portion is of bell shape indicated at 27'. The output shaft 27 is supported by bearing 28 on the outer end. The inner end bell 27' of the output shaft 27 is rigidly connected, as by bolts, one of which is shown at 29, to a multipiston cylinder block member indicated at 30. The block member 30 is also supported by the bearing 25 on the input shaft 23. The output shaft 27 protrudes externally from the housing 16 and may be splined for drive connection to the load such as the conventional final drive means to ground engaging propelling elements of a vehicle, for example the drive wheels of a tractor. From the above it can be seen that the input shaft 23, output shaft 27 and the block member 30 all rotate about a common axis and supported by the housing 16 through bearings 24, 25, 26 and 28. It will be noted that none of the bearings are of the thrust type.

The block member 30 is a unitary structure and is provided with a plurality of longitudinally extending bores 31 circumferentially disposed equidistantly as best seen in FIGURES 2 and 4. The bores 31 do not extend clear through the block member 30 but instead terminate to provide walls on the rightward end thereof, one of which is shown at 32 in FIGURE 2. The walls 32 are each provided with a fluid port, one of which is shown at 33 in FIGURE 2. Slidably disposed in each of the bores 31 is a pump piston 34 as best shown in FIGURES 2 and 4. The outer end of each of the pump pistons 34 is fitted with a follower or thrust shoe 35 of the conventional ball and socket type which permits angular movement of the shoes 35 with respect to the pistons 34. Each of the pistons 34 is provided with an axial fluid duct 36 which allows fluid pressure to assume a portion of the force applied to move the pistons 34 in the rightward direction, the remainder of the force being assumed by the shoes 35.

Figure 3:
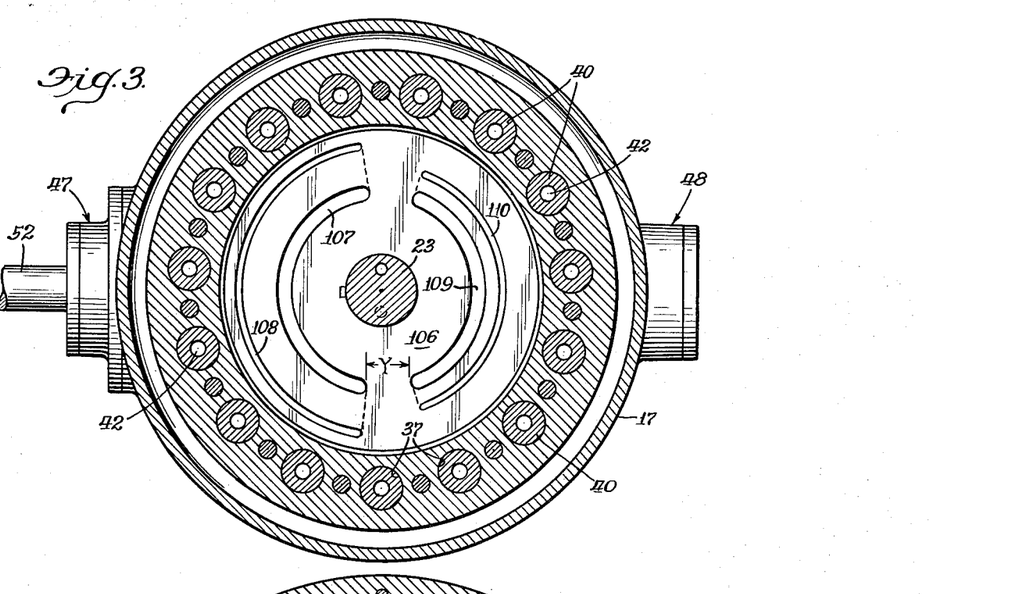
FIGURE 3 is a transverse sectional view taken on line 3—3 of FIGURE 1 illustrating the arrangement of fluid ports on the rotatable valve element.

The block member 30 is also provided with a plurality of longitudinally extending bores 37 as indicated in FIGURES 2, 3 and 4. The bores 37 do not extend clear through the block member 30 but instead terminate to provide walls on the leftward end thereof, one of which is shown at 38 in FIGURE 2. The walls 38 are each provided with a fluid port, one of which is shown at 39 in FIGURE 2. Slidably disposed in each of the bores 37 is a motor piston, one being shown at 40 in FIGURE 2. The outer end of each of the motor pistons 40 is fitted with a follower or thrust shoe 41 of the conventional ball and socket type which permits angular movement of the shoes 41 with respect to the pistons 40. Each of the motor pistons 40 is provided with an axial fluid duct 42 which, as in the case of pump pistons 34, allows fluid pressure to assume a portion of the force applied to move the pistons 40 in the rightward direction as viewed in FIGURE 2, the remainder of the force being assumed by the shoes 41.

The block member 30 is also provided with two circular concentric fluid passages 43 and 44 as best shown in FIGURES 1, 2 and 4. Referring to FIGURES 1, 2 and 4 it will be seen that there are a plurality of post elements 45, eight of which may be best seen in FIGURE 4. These post elements 45 are merely necessary structure to make the block member 30 an integral unit structurally. From this it will be apparent that the fluid passage 43 communicates with a circular opening on the left face with a similar opening on the right face of the block member 30 as viewed in FIGURES 1 and 2, the fluid merely moving around the post elements 45. The same is true for the fluid passage 44. Depending upon the direction of rotation of the input shaft 23, one of the fluid passages 43 and 44 is for high fluid pressure and the other for low fluid pressure. Thus fluid passages 43 and 44 do not communicate with each other within the block member 30.

Mounted on housing element 17 is a stationary swash plate indicated at 46. The term "stationary swash plate" 46 is intended to mean that it is not rotatable with respect to the axes of the input shaft 23 and the output shaft 27 but is adjustable rotatively on a transverse axis (angular displacement). Referring to FIGURE 2 it will be seen that the housing element 17 is provided with a pair of bearings 47 and 48 in alignment with each other as shown. The stationary swash plate 46 is provided with a pair of stub shafts 49 and 50 in alignment with each other for reception into bearings 47 and 48 respectively. Thus the swash plate 46 is supported by bearings 47 and 48 rotatively in a transverse direction.

The stationary swash plate 46 is of generally an annular shape having an annular face 51 positioned in engaging relation with the thrust shoes 41 of the motor pistons 40 slidable thereon. From this it is apparent that the stationary swash plate 46 is limited rotatively about the bearings 47 and 48 by the output shaft 27 passing therethrough as is evident from FIGURES 1 and 2. As shown in full lines in FIGURE 1 the face 51 is in a plane perpendicular to the axis of rotation of the input and output shafts 23 and 27. In such position the motor pistons 40 will not reciprocate longitudinally, i.e. they are at zero stroke. However if the swash plate 46 is rotated in an angular displacement to a position 46' as shown in phantom in FIGURE 1, the motor pistons 40 will reciprocate at maximum stroke as the block member 30 rotates with the output shaft 27. The swash plate 46 is angularly displaced by rotative movement of the control shaft 52 keyed to the stub shaft 49. Rotative movement of the control shaft 52 may be accomplished by any conventional means such as, for example, a crank arm connected to a hydraulic power cylinder (not shown) or other mechanical means conventionally known.

Figure 5:
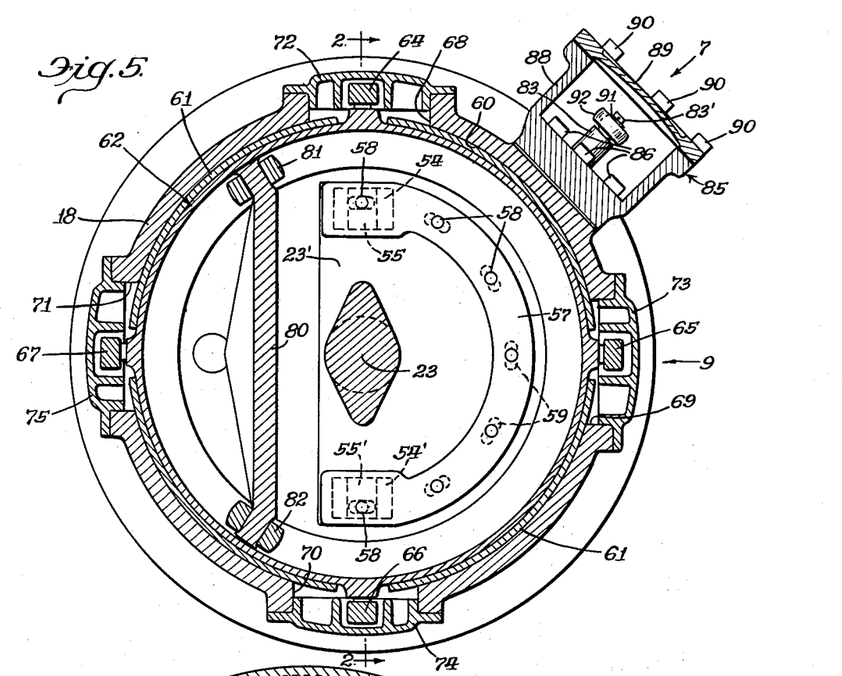
FIGURE 5 is a transverse sectional view taken on line 5—5 of FIGURE 2 illustrating details for controlling the angular displacement of the rotatable swash plate to regulate or selectively vary the stroke of the pump pistons in the carrier member.

Mounted on the input shaft 23 for rotation therewith is a movable or rotatable swash plate 53 as best seen in FIGURES 1 and 2. The input shaft 23 is provided with a generally semi-circular section 23' near the housing element 19 as best seen in FIGURES 1, 2 and 5. Adjustably secured to the section 23' is a semi-circular shaped backing plate 57. The backing plate 57 is secured to section 23' by a plurality of bolts 58 best seen in FIGURE 5.

The section 23' is provided with arcuate shaped elongated holes 59 shown in dotted lines in FIGURE 5 adapted to receive respectively the bolts 58. From this it can be seen that the backing plate 57 may, while bolts 58 are loosened, be adjustably rotated with respect to the input shaft 23 within the limits of the elongated holes 59 for a purpose which will become apparent later herein. The bolts 58 are accessible externally through holes 58', two of which are shown in FIGURE 2, in the housing element 19. The holes 58' are covered by conventional plugs 150 of the removable type.

The backing plate 57 is provided with a pair of transverse bearings indicated at 54 and 54' positioned in alignment with each other as best shown in FIGURES 2 and 5. The rotatable swash plate 53 is provided with a pair of stub shafts 55 and 55' positioned for reception into bearings 54 and 54' respectively. This arrangement permits the rotatable swash plate 53 to swivel transversely (angular displacement) about the common axis of the stub shafts 55 and 55' but at the same time constrained for rotation with the input shaft 23. Means for controlling externally the angular displacement of the movable swash plate 53 will now be described.

Referring to FIGURE 5 it will be seen that the housing element 18 is provided with an axially disposed large bore 60 having a sleeve liner 61 in press-fit relation. The sleeve liner 61 is made of a suitable bearing metal such as brass or the like. Disposed in slidable relation within the sleeve line 61 is a ring member indicated at 62 as best shown in FIGURES 1, 2 and 5. The ring member 62 has an annular shaped groove or recess 63 opening inwardly as best seen in FIGURES 1 and 2 for a purpose later described. The outer peripheral surface of the ring member 62 is provided with four projection lugs 64, 65, 66 and 67 spaced at 90° apart as shown best in FIGURE 5. In order to accommodate the projecting lugs 64, 65, 66 and 67, the housing element 18 and sleeve liner 61 are provided with four openings 68, 69, 70 and 71 respectively as shown in FIGURES 1, 2, 5 and 7, the latter indicating the general shape thereof. Each of the openings 68, 69, 70 and 71 are provided with caps 72, 73, 74 and 75 respectively as shown in FIGURES 1, 2 and 5. Each of the caps 72, 73, 74 and 75 are secured in sealed relation to the openings 68, 69, 70 and 71, respectively, of the housing element 18 as by bolts or screws (not shown).

Each of the caps 72, 73, 74 and 75 have an angularly disposed slot (about 45° with reference to the longitudinal direction) shown at 76, 77, 78 and 79, respectively, in FIGURES 1 and 2 adapted to receive slidably lugs 64, 65, 66 and 67, respectively. From this it immediately becomes apparent that rotative movement of the ring member 62 in one direction moves it axially in one direction. Conversely, reverse rotation of the ring member 62 moves it axially in the opposite direction.

Referring now to FIGURES 1 and 5 it will be seen that the movable swash plate 53 includes an ear portion 80 having follower elements 81 and 82 at the ends thereof. The follower elements 81 and 82 extend into and are received in the circular recess 63 of the ring member 62. It should now be apparent that as the ring member 62 is shifted axially the angular displacement of the movable swash plate 53 is correspondingly shifted about the common axis of the stub shafts 55 and 55'.

Figure 7:
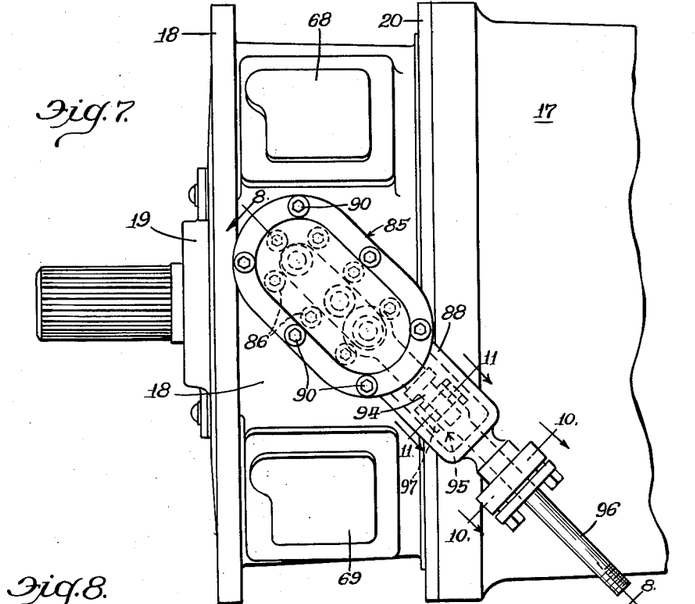
FIGURE 7 is an external view partly broken away taken in the direction indicated by the numeral 7 of FIGURE 5 further illustrating details for controlling the angular displacement of the rotatable swash plate to vary selectively the stroke of the pump pistons in the carrier member.
Figure 8:
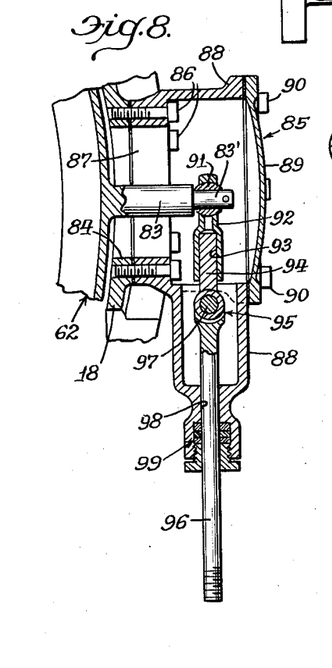
FIGURE 8 is a sectional view taken on line 8—8 of FIGURE 7 illustrating further details of the means for controlling the angular displacement of the rotatable swash plate.

Now in order to rotate the ring member 62 for controlling the angular displacement of the movable swash plate 53, the ring member 62 is provided with a fifth projecting lug 83 as best seen in FIGURES 5 and 8. In order to accommodate the projecting lug 53 the housing element 18 is provided with a fifth opening 84 as shown in FIGURE 8. Secured to the housing element 18 over the opening 84 in sealed relation is a control casing generally indicated at 85. The casing 85 is secured to the housing element 18 by a plurality of bolts 86 indicated in FIGURES 7 and 8.

Figure 9:
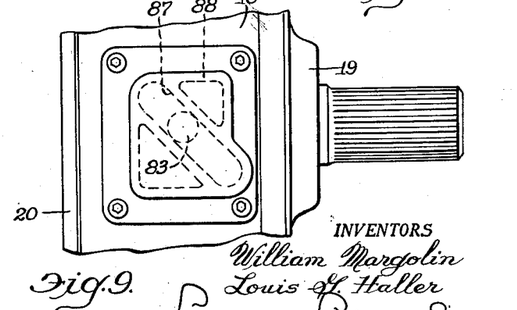
FIGURE 9 is an external view partly broken away taken in the direction 9 of FIGURE 7 illustrating a further detail of the means for controlling the angular displacement of the rotatable swash plate.
Figure 10:
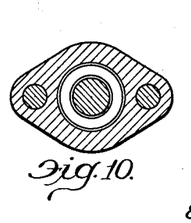
FIGURE 10 is a sectional view taken on line 10—10 of FIGURE 7 illustrating the support means for an axially slidable control rod which actuates the means for controlling the rotatable swash plate.

Referring to FIGURES 8 and 9 it will be seen that the lower floor portion of the control casing, adjacent the housing element 18, includes an angular groove or slot 87 having the same angular characteristics as the slots 76, 77, 78 and 79 previously described. Thus movement of the lug 83 in the slot 87 also shifts the ring member 62 axially as previously described.

Figure 11:
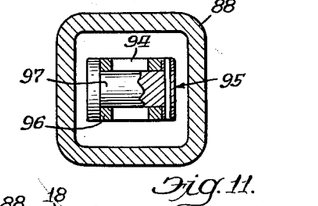
FIGURE 11 is a sectional view taken on line 11—11 of FIGURE 7 showing details of a pivot connection for the control rod mentioned in the description of FIGURE 10.

The control casing 85 includes a base member 88 and a cover plate 89 bolted together in sealed relation as by bolts 90. In FIGURE 8 it will be seen that the outer end portion of the lug 83 is of reduced diameter at 83'. Journalled for rotation on the portion 83' is a bearing element 91 having its outer surface generally spherical shaped as shown. In journalled relation with bearing element 91 is a pivot arm 92. Thus the pivot arm 92 is not only rotatable about the axis of the lug 83 but it may also swivel limitedly in angular relation with respect to the lug 83. The pivot arm 92 is provided with a bore 93 for pressed fit or threaded reception of one end portion of link 94. The other end portion of link 94 is pivotally connected as indicated at 95. A control rod 96 is pivotally connected to the link 94 by a pivot pin 97 as shown in FIGURES 7, 8 and 11. The control rod 96 is slidable within bore 98 of the base member 88 as best shown in FIGURE 8. A conventional packing seal indicated at 99 may be employed to prevent fluid leakage thereby. From this arrangement it will be apparent that linear movement of the control rod 96 relatively moves the ring member 62 which in turn controllably shifts the angular displacement of the rotatable swash plate 53 as above described. Controlled linear movement of the control rod 96 may be accomplished by any conventional means such as a two-way lockable hydraulic ram (not shown). A similar type of hydraulic ram may be employed for actuating the control shaft 52 for controlling the angular displacement of the stationary swash plate 46 previously described. However, it is preferable that the angular displacement of the swash plates 46 and 53 should be controllable independently of each other for reasons which will be evident later herein.

Referring to FIGURES 1, 2 and 6 it will be seen that the stationary valve member 20 is provided with four arcuate grooves 100, 101, 102 and 103. The groove 100 communicates with groove 101 through the duct 104. Groove 102 communicates with groove 103 through the duct 105. The duct 105 also communicates with ports 39 of all motor pistons in the block member 30 below the axis of the input shaft 23 with reference to the plane of FIGURE 2. In a similar manner the duct 104 communicates with the ports 39 of all motor pistons 40 above the axis of the input shaft 23 with reference to the plane of FIGURE 2. The arcuate length of the ports 39 in the block member 30 as viewed in FIGURE 4 should be approximately equal to the distance $x$ in FIGURE 6 as otherwise either hydraulic lock may occur or fluid leakage betwen the grooves 100 and 102 may occur. For as previously stated, depending upon the direction of rotation of the input shaft 23, one of the fluid passages 43 or 44 in block member 30 will be at high pressure and the other low pressure.

With reference to FIGURES 1 and 2 it will be seen that in abutting relation with the rightward end face of the block member 30 is a rotatable valve member indicated at 106, also sometimes referred to as a rotatable "kidney valve." The rotatable valve member 106 is constrained for rotation with the input shaft 23 as by conventional key or spline. Further, the rotatable valve member 106 is in fixed relation with the input shaft 23 by conventional means so that the valve member 106 may not move axially with respect to the input shaft 23. Referring now to FIGURE 3 it will be seen that the valve member 106 is provided with four arcuate shaped grooves 107, 108, 109 and 110. Groove 107 communicates with groove 108 through duct 111 (FIGURE 2) and groove 109 communicates with groove 110 through duct 112. From FIGURE 2 it will be seen that duct 112 communicates fluid passage 43 with each of the pump pistons 34 below the axis of the input shaft 23 while duct 111 communicates fluid passage 44 with the pump pistons 34 above the axis of the input shaft 23. Similar to the arcuate shaped ports 39 of the motor pistons 40, the length of the arcuate shaped ports 33 for the pump pistons 34 should be approximately the same length as the distance y between the grooves 107 and 109 as viewed in FIGURE 3.

At this point it may be appreciated that during operation of the transmission 15 the input shaft 23 and output shaft 27 including the block member 30 normally would be urged mechanically in the leftward direction as viewed in FIGURE 2 for they react against the angularly displaced stationary swash plate 46 (e.g. 46'). Normally this would require that bearing 24 in the housing element 19 be of the thrust type. However there will be a greater hydraulic force tending to separate the end faces of the block member 30 from its abutting stationary valve member 20 and rotatable valve member 106 by hydraulic action respectively therebetween. Normally this would require the bearing 28 in the housing element 17 to be also of the thrust type. In order to offset or balance these unequal forces a novel force compensating device, indicated at 113 in FIGURE 2, has been provided which will now be described in detail.

Referring to FIGURE 2 the force compensating device 113 comprises a small axial bore 114 disposed in the rightward end portion of the input shaft 23 as shown. Slidably disposed within the small bore 114 is a small piston 116 integrally connected to a large piston 117 slidable within the large bore 115. The rightward end portion is provided with a stop element 118 in press fit relation to the input shaft 23 having a longitudinal duct 119 therein as shown. From this it can be seen that three chambers 120, 121 and 122 are formed.

Disposed within the rotatable valve member 106 is a small duct 123, one end of which communicates with the duct 111 as shown. The other end of the small duct 123 opens into a large duct 124 forming a seat for a one-way ball-type check valve 125. A second small duct 126 is also provided in 180° relation with respect to duct 123 as shown. One end of the second small duct 126 communicates with the duct 112 as shown. The other end of the duct 126 opens into a second large duct 127 forming a seat for a one-way ball-type check valve 128. Disposed on the input shaft 23 in register relation with the large ducts 124 and 127 is a circumferential groove 129 as shown. As mentioned previously, depending upon the direction of movement of the input shaft 23, one of the ducts 111 and 112 will be of high pressure and the other low pressure. However, the circumferential groove 129 will always be at high pressure for the ball valve 125 or 128 on the high pressure side will open while the other will close.

Disposed longitudinally within the input shaft 23 is a high pressure fluid conduit 130, one end of which communicates with the chamber 120 and the other end communicates with the circumferential groove 129 through transverse hole 131 in the input shaft 23 as shown. Thus the chamber 120 is always at high fluid pressure which urges the small piston 116 rightwardly as viewed in FIGURE 2. A second longitudinal conduit 132 is provided in the input shaft 23 as shown. One end of the conduit 132 communicates with chamber 121 and the other end communicates with the clearance 133 between the block member 30 and the input shaft 23 necessitated by the bearing 25. Thus the chamber 121 is vented to the housing chamber 134. The housing 16 may be provided with a conventional drain (not shown) for draining fluid leakage therefrom.

From the above it can be seen that the small piston 116 of the device 113 is always under high pressure which urges the large piston 117 rightwardly thus pressurizing the fluid in the chamber 122 and duct 119. At this time it will be noted from FIGURE 2 that the output shaft 27 and its associated bell 27' forms a fluid filled compartment 135 with the input shaft 23 and its associated rotatable valve member 106. Thus fluid under pressure in the duct 119 pressurizes the fluid in the compartment 135. Fluid pressure in the compartment 135 urges the output shaft 27 and block member 30 rightwardly and reactively urging the input shaft 23 and associated rotatable valve member 106 leftwardly. By selectively proportioning the diameters of the pistons 116 and 117 it can be seen that the mechanical and hydraulic forces can be balanced so that axial thrust of the input shaft 23 and output shaft 27 is avoided. Further it will be noted that the above mentioned forces are proportioned to the load on the transmission 15 and the fluid pressure in the compartment 135 will vary correspondingly but the aggregate forces opposed to each other as explained will always be balanced.

It will be appreciated some fluid leakage from the compartment 135 may occur which would have the effect of moving the pistons 116 and 117 rightwardly as viewed in FIGURE 2 toward the limit of stop element 118. Means will now be described for introducing additional fluid under pressure into the compartment 135 for replenishing loss of fluid through leakage.

Referring to FIGURE 2 it will be seen that the input shaft 23 is provided with a transversely disposed duct 136 which communicates the compartment 135 with the small axial bore 114 which carries the small piston 116 positioned as shown. Now as the small piston 116 moves rightwardly beyond a predetermined limit, the piston 116 uncovers the duct 136 thereby communicating the compartment 135 with the chamber 120. Since the chamber 120 is always under high pressure, fluid therefrom passes into the compartment 135. As the pressure increases in the compartment 135 it also increases the fluid pressure in chamber 122 through the duct 119. Since the diameter of large piston 117 is greater than the diameter of small piston 116, the increased pressure in chamber 122 drives piston 117 and its associated piston 116 leftwardly thereby throttling the duct 136. Thus the compartment 135 is replenished with fluid at high pressure to compensate for loss of fluid by leakage.

At this point it may become apparent to those skilled in the art that the hydraulic system of the transmission 15 is of the closed circuit type. Owing to the fact that fluid leakage of such a hydraulic system as described occurs from time to time which leakage fluid is drained from the stationary housing 16 through a conventional drain therefrom (not shown) some means for replenishment of leakage fluid must be provided. This is accomplished as follows.

Referring to FIGURE 2 the stationary valve member 20 is provided with radial ducts 137 and 138 shown in dotted lines. The outer end of the duct 137 communicates with the external conduit 139 and the inner end communicates with the duct 104. A one-way inlet check valve 140 is interposed in the duct 137 permitting fluid to enter the duct 137 from conduit 139 but permits no fluid flow in the opposite direction. Likewise the inner end of the duct 138 communicates with the duct 105 and the outer end thereof communicates with conduit 141. Interposed in the duct 138 is a one way inlet check valve 142 permitting fluid to flow from the conduit 141 to duct 138 but prevents flow of fluid in the opposite direction. The check valves 140 and 142 may be of the conventional type. The conduits 139 and 141 are both connected to a superatmospheric low pressure (e.g. 100 p.s.i.) source of fluid pressure (not shown). From previous discussion it will be recalled that depending upon the direction of rotation of the input shaft 23, one of the ducts 104 and 105 will be at high pressure and the other at low pressure. Should there be a deficiency of fluid in the hydraulic system, one of the ducts 104 and 105 will be at a pressure below the fluid pressure in conduits 139 and 141 and thus its corresponding check valve 140 or 142 will open admitting fluid into the system.

Having now described the construction of a preferred embodiment of the invention in detail, the operation thereof will now be described.

*Operation*

In FIGURES 1 and 2 as shown in full lines the swash plates 46 and 53 are in the perpendicular position. Thus neither the motor pistons 40 nor the pump pistons 34 reciprocate and therefore no power is transmitted from the input shaft 23 to the output shaft 27. This is neutral position. However, it is quite difficult to fix the swash plates 46 and 53 in the perpendicular position. Any deviation of the swash plate 53 from the perpendicular will cause transmittal of power to the output shaft 27. Thus to maintain a neutral position the control shaft 52 and the control rod 96 should be allowed to "float" so that their respective swash plates 46 and 53 may co-act to find their true neutral position.

Preparatory to transmitting power, the stationary swash plate 46 is fixed in its extreme clockwise position 46'. With the rotatable swash plate 53 in the perpendicular position, no fluid will be pumped and the output shaft 27 will not rotate. Hence, the speed ratio will be zero.

By moving the control rod 96 so that ring member 62 moves toward the output shaft end of the transmission, fluid will be pumped which will cause the output shaft 27 to rotate in the same direction as the input shaft 23 at a speed less than input speed. Output speed will be a function of the distance that ring member 62 has caused the rotatable swash plate 53 to rotate in a clockwise direction from the perpendicular position, as viewed in FIGURE 1.

After ring member 62 has moved to its extreme rightward position so that rotatable swash plate 53 has moved to position 53' on FIGURE 1, output shaft speed may be further increased by moving the stationary swash plate 46 in a counterclockwise direction away from position 46' and toward the perpendicular.

As the forward speed ratio is varied from zero toward unity, the proportion of input power transmitted hydraulically decreases becoming zero when output shaft 27 speed equals shaft 23 speed. At this point the hydraulic system is locked as no fluid flow occurs and thus the power transmission is entirely mechanical.

A further increase (forward overdrive) in output shaft 27 speed is achieved by continuing the counterclockwise rotation of the stationary swash plate 46 toward the position indicated by the phantom lines 46'' on FIGURE 1.

In the forward overdrive range, the transmission becomes regenerative and hydraulic fluid flow increases with speed ratio.

For reverse operation, the stationary swash plate 46 is again set in its extreme clockwise position 46' and rotatable swash plate 53 in the perpendicular position. If now the control rod 96 is moved so as to rotate the ring member 62 in the direction which causes it to move toward the left, or input shaft end of the transmission, the output shaft 27 will rotate in the direction opposite to that of the input shaft 23 with increasing speed until the ring member 62 reaches its extreme position and the rotatable swash plate is in position 53''. Further increase in output shaft speed (reverse overdrive) may be accomplished by causing the stationary swash plate 46 to move toward the perpendicular.

A reverse speed ratio of 1:1 is obtained when the aggregate displacement of the motor pistons 40 per revolution is equal to twice that of the pump pistons 34. Further decrease in motor piston displacement by additional movement of the stationary swash plate 46 toward the perpendicular will increase the reverse speed ratio.

For reverse operation, motor piston displacement per revolution will always be greater than that of the pump.

From the above it will become apparent that the transmission of power to the output shaft 27 except in neutral or direct forward drive the power transmission is part mechanical and the balance hydraulic. As the speed of the output shaft 27 changes in a direction opposite to direct drive the proportion of power transmission hydraulically increases and mechanical power-transmission correspondingly decreases.

Excepting for netural and direct drive (1:1 ratio forward) as above described, the pump pistons 34 and motor pistons 40 will reciprocate. In FIGURE 2 it will be assumed that the pump piston 34 shown in full lines is being driven retractively by the movable swash plate 53. Thus high pressure fluid at port 33 will flow into duct 112 to the groove 110 in the rotatable valve member 106. The high pressure fluid from groove 110 passes into the circular fluid passage 43 in the block member 30 and discharges into arcuate groove 101 in the stationary valve member 20. From the arcuate groove 101 the high pressure fluid passes to arcuate groove 100 through duct 104 and to motor piston, indicated for convenience at 40', in FIG. 2 in dotted lines. Thus motor piston 40' will react against stationary swash plate 46.

Meanwhile the stationary swash plate 46 drives motor piston 40 respectively. Fluid at low pressure is discharged through port 39 of the block member 30 into duct 105 through arcuate groove 102 in the stationary valve member 20. From duct 105 low pressure fluid passes through arcuate groove 103 of the stationary valve member 20 into circular fluid passage 44 in the block member 30. The low pressure fluid in the circular fluid passage 44 discharges into arcuate groove 108 in the rotatable valve member 106. From arcuate groove 108 the low pressure fluid passes to arcuate groove 107 through duct 111 in the rotatable valve member 106. From the arcuate groove 107 the low pressure fluid passes to the pump piston indicated for convenience at 34' in FIGURE 2 in dotted lines. This low pressure urges the pump piston 34' expansively for maintaining its respective shoe with the movable swash plate 53.

At this point it is mentioned that the reason for providing means to adjust rotatively the position of the stationary valve member 20 is to make certain that the arcuate grooves 100, 101, 102 and 103 are properly positioned with reference to the transverse pivotal axis of the stationary swash plate 46 so that they are in correct phased relation with each other. Likewise the backing plate 57 of the movable swash plate 53 may be adjustably rotated so that the movable swash plate 53 is in correct phased relation with respect to the arcuate grooves 107, 108, 109 and 110 of the rotatable valve member 106. Out-of-phased relation of the above described members results in lowering the efficiency of operation of the transmission 15 of this invention.

Having thus described a preferred embodiment of the invention in detail it can be seen that the objects of the invention have been fully achieved and it must be understood that changes and modifications may be made which do not depart from the spirit of the invention nor from the scope thereof as defined in the appended claims.

What is claimed is:

1. A variable speed hydromechanical transmission comprising, in combination, a stationary housing having a power input shaft and a hollow power output shaft disposed longitudinally therein, said output shaft being in concentric relation with a portion of said input shaft, a block member having high pressure and low pressure fluid passages disposed in concentric relation with respect to said input shaft and constrained for rotation with said output shaft, a rotatable swash plate disposed in one end portion of said housing and constrained for rotation with said input shaft, said swash plate being pivotally displaceable on a transverse axis, a ring member axially slidable in said housing, said ring member having an inner annular goove, a follower element connected to said swash plate and positioned in slidable relation in said annular groove of said ring member, an external control rod operably connected to said ring member adapted to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate positioned to control the angular displacement thereof about said second transverse axis, a stationary valve member positioned in abutting relation with one end of said block member, externally adjustable means for rotatively adjusting said stationary valve member with respect to said stationary swash plate, a rotatable valve member constrained for rotation with said input shaft and positioned in abutting relation with the other end of said block member, externally accessible means for rotatively adjusting said rotatable valve member with respect to said rotatable swash plate, a plurality of motor cylinders disposed longitudinally in the outer peripheral portion of said block member in circumferential spaced relation, said motor cylinders being positioned in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members and said block member having high pressure and low pressure interconnecting fluid ducts communicating between said motor cylinders and said pump cylinders through said fluid passages in phased relation, a fluid pressure compartment disposed between said output shaft and said rotatable valve member, a hydraulic force compensating device disposed in said input shaft communicatively connected to said high pressure fluid duct for actuation thereof, said device being adapted to balance axial thrust reactive forces between said input shaft and said output shaft thereby avoiding axial thrust forces on said housing, at least one fluid second duct having an inlet check valve disposed in said stationary valve member communicatively connecting at least one fluid passage with a source of fluid at low pressure for replenishing fluid leakage losses, said control rod and said control shaft being actuatable for selectively shifting the angular displacement of each of said swash plates whereby the speed of said output shaft may be infinitely varied in a range from overdrive speed in one direction to overdrive speed in the opposite direction.

2. A variable speed hydromechanical transmission comprising, in combination, a stationary housing having a power input shaft and a hollow output shaft disposed longitudinally therein, said output shaft being in concentric relation with a portion of said input shaft, a block member having high pressure and low pressure fluid passages disposed in concentric relation with respect to said input shaft and constrained for rotation with said output shaft, a rotatable swash plate disposed in one end portion of said housing and constrained for rotation with said input shaft, said swash plate being pivotally displaceable on a transverse axis, a ring member having an inner annular groove axially slidable in said housing, a follower element connected to said swash plate and positioned slidably in said groove of said ring member, an external control rod operably connected to said ring member positioned to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate adapted to control the angular displacement thereof about said second transverse axis, an externally adjustable stationary valve member positioned in abutting relation with one end of said block member, a rotatable valve member having externally accessible adjusting means constrained for rotation with said input shaft and positioned in abutting relation with the other end of said block member, a plurality of motor cylinders disposed longitudinally in the outer peripheral portion of said block member in circumferential spaced relation, said motor cylinders being positioned in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members having high pressure and low pressure interconnecting fluid ducts communicating between said motor and said pump cylinders through said fluid passages in phased relation, and means disposed in said stationary valve member for introducing fluid at low pressure from a source into said low pressure fluid ducts, said control rod and said control shaft being actuatable for selectively shifting the angular displacement of each of said swash plates whereby the speed of said output shaft may be infinitely varied in a range from overdrive speed in one direction to overdrive speed in the opposite direction.

3. A variable speed hydromechanical transmission comprising, in combination, a stationary housing having a power input shaft and a hollow output shaft, said output shaft being in concentric relation with a portion of said input shaft, a block member having high pressure and low pressure fluid passages disposed in concentric relation with respect to said input shaft and constrained for rotation with said output shaft, a rotatable swash plate disposed in one end portion of said housing and constrained for rotation with said input shaft, said swash plate being pivotally displaceable on a transverse axis, a ring member axially slidable in said housing, said ring member having an inner annular groove, a follower element connected to said swash plate and positioned in slidable relation in said annular groove of said ring member, an external control rod operably connected to said ring member adapted to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate positioned to control the angular displacement thereof about said second transverse axis, a stationary valve member positioned in abutting relation with one end of said block member, a rotatable valve member constrained for rotation with said input shaft and positioned in abutting relation with the other end of said block member, a plurality of motor cylinders disposed longitudinally in the outer peripheral portion of said block member in circumferential spaced relation, said motor cylinders being positioned in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members and said block members having high pressure and low pressure interconnecting fluid ducts communicating between said motor cylinders and said pump cylinders through said fluid passages in phased relation, means disposed in said stationary valve member for introducing fluid at low pressure from a source into said low pressure fluid ducts for replenishing leakage fluid losses, a fluid pressure compartment disposed between said output shaft and said rotatable valve member, a hydraulic force compensating device disposed in said transmission communicatively connected to said high pressure fluid duct for actuation thereof, said device being adapted for pressurizing said compartment to balance axial thrust reactive forces between said input shaft and said output shaft thereby avoiding axial thrust forces on said housing, said control rod and said control shaft being actuatable for selectively shifting the angular displacement of each of said swash plates whereby the speed of said output shaft may be infinitely varied in a range from overdrive speed in one direction to overdrive speed in the opposite direction.

4. A variable speed hydromechanical transmission comprising, in combination, a stationary housing having a power input shaft and a hollow output shaft disposed longitudinally therein, said output shaft being in concentric relation with a portion of said input shaft, a block member disposed in concentric relation with respect to said input shaft and constrained for rotation with said output shaft, a rotatable swash plate disposed in one end portion of said housing and constrained for rotation with said input shaft, said swash plate being pivotally displaceable on a transverse axis, a ring member having an inner annular groove axially slidable in said housing, a follower element connected to said swash plate and positioned slidably in said groove of said ring member, an external control rod operably connected to said ring member positioned to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate positioned to control the angular displacement thereof about said second transverse axis, an externally adjustable stationary valve member positioned in abutting relation with one end of said block member, a rotatable valve member having externally accessible adjusting means constrained for rotation with said input shaft and positioned in abutting relation with the other end of said block member, a plurality of motor cylinders disposed longiudinally in the outer peripheral portion of said block member in circumferential spaced relation, said motor cylinders being in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members having high pressure and low pressure interconnecting fluid ducts communicating between said motor cylinders and said pump cylinders through said fluid passages in phased relation, means disposed in said stationary valve member for introducing fluid at low pressure from a source into said low pressure fluid duct for replenishing leakage fluid losses, a fluid pressure compartment disposed between said output shaft and said rotatable valve member, a hydraulic force compensating device disposed in said transmission communicatively connected to said high pressure fluid duct for actuation thereof, said device being positioned for pressurizing said compartment to balance axial thrust forces between said input shaft and said output shaft thereby avoiding axial thrust forces on said housing, said control rod and said control shaft being actuatable for selectively shifting the angular displacement of each of said swash plates whereby speed of said output shaft may be infinitely varied in a range from overdrive speed in one direction to overdrive speed in the opposite direction.

5. A variable speed hydromechanical transmission comprising, in combination, a stationary housing having a power input shaft and a hollow output shaft disposed longitudinally therein, said output shaft being in concentric relation with a portion of said input shaft, a block member disposed in concentric relation with respect to said input shaft and constrained for rotation with said output shaft, a rotatable swash plate disposed in one end of said housing and constrained for rotation with said input shaft, said swash plate being pivotally displaceable on a transverse axis, a ring member having an inner annular groove axially slidable in said housing, a follower element connected to said swash plate and positioned slidably in said groove of said ring member, an external control rod operably connected to said ring member positioned to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate adapted to control the angular displacement thereof about said second transverse axis, an externally adjustable stationary valve member positioned in abutting relation with one end of said block member, a rotatable valve member constrained for rotation with said input shaft and positioned in abutting relation with the other end of said block member, a plurality of motor cylinders disposed longitudinally in the outer peripheral portion of said block member in circumferential spaced relation, said motor cylinders being in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members having high pressure and low pressure interconnecting fluid ducts communicating between said motor cylinders and said pump cylinders through said fluid passages in phased relation, means disposed in said stationary valve member for introducing fluid at low pressure from a source into said low pressure fluid duct for replenishing leakage fluid losses, and said control rod and said control shaft being actuatable for selectively shifting the angular displacement of each of said swash plates whereby the speed of said output shaft may be infinitely varied in a range from overdrive speed in one direction to overdrive speed in the opposite direction.

6. A variable speed hydromechanical transmission comprising, in combination, a stationary housing having a power input shaft and a hollow output shaft disposed longitudinally therein, said output shaft being in concentric relation with a portion of said input shaft, a block member disposed in concentric relation with respect to said input shaft and constrained for rotation with said output shaft, a rotatable swash plate disposed in one end of said housing and constrained for rotation with said input shaft, said swash plate being pivotally displaceable on a transverse axis, a ring member having an inner annular groove axially slidable in said housing, a follower element connected to said swash plate and positioned slidably in said groove of said ring member, an external control rod operably connected to said ring member adapted to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate adapted to control the angular displacement thereof about said second transverse axis, a stationary valve member positioned in abutting relation with one end of said block member, a rotatable valve member constrained for rotation with said input shaft and positioned in abutting relation with the other end of said block member, a plurality of motor cylinders disposed longitudinally in the outer peripheral portion of said block member in circumferential spaced relation, said motor cylinders being in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members having high pressure and low pressure interconnecting fluid ducts communicating between said motor cylinders and said pump cylinders through said fluid passages in phased relation, means disposed in said stationary valve member for introducing fluid at low pressure from a source into said low pressure fluid duct for replenishing leakage fluid losses, and said control rod and said control shaft being actuatable for selectively shifting the angular displacement of each of said swash plates whereby the speed of said output shaft may be infinitely varied in a range from overdrive speed in one direction to overdrive speed in the opposite direction.

7. A variable speed hydromechanical transmission comprising, in combination, a stationary housing having a power input shaft and a hollow output shaft disposed longitudinally therein, said output shaft being in concentric relation with a portion of said input shaft, a block member having high pressure and low pressure fluid passages disposed in concentric relation with respect to said input shaft and constrained for rotation with said output shaft, a rotatable swash plate disposed in one end of said housing and constrained for rotation with said input shaft, said swash plate being pivotally displaceable on a transverse axis, a ring member having an inner annular groove axially slidable in said housing, a follower element connected to said swash plate and positioned slidably in said groove of said ring member, an external control rod operably connected to said ring member adapted to move selectively said ring member axially for controlling the angular displacement of said swash plate about said transverse axis, a stationary swash plate disposed in the other end portion of said housing, said stationary swash plate being pivotally displaceable on a second transverse axis, an external control shaft operably connected to said stationary swash plate adapted to control the angular displacement thereof about said second transverse axis, a stationary valve member positioned in abutting relation with one end of said block member, a rotatable valve member constrained for rotation with said input shaft and positioned in abutting relation with the other end of said block member, a plurality of motor cylinders disposed longitudinally in the outer peripheral portion of said block member in circumferential spaced relation, said motor cylinders being in operable relation with said stationary swash plate, a plurality of pump cylinders disposed longitudinally in the inner peripheral portion of said block member in circumferential spaced relation, said pump cylinders being positioned in operable relation with said rotatable swash plate, said valve members having high pressure and low pressure interconnecting fluid ducts communicating between said motor cylinders and said pump cylinders through said fluid passages in phased relation, and said control rod and said control shaft being actuatable for selectively shifting the angular displacement of each of said swash plates whereby the speed of said output shaft may be infinitely varied in a range from overdrive speed in one direction to overdrive speed in the opposite direction.

8. A variable speed hydromechanical transmission comprising, in combination, a stationary housing having a power input shaft and an output shaft disposed therein, a block member having high pressure and low pressure fluid passages disposed in concentric relation with a portion of said input shaft and constrained for rotation with said output shaft, a rotatable swash plate disposed in said housing and constrained for rotation with said input shaft, said swash plate being displaceable on a transverse axis, a ring member having an inner annular groove slidable in said housing, a follower element connected to said swash plate and positioned slidably in said groove of said ring member, an external control rod operably connected to said ring member adapted to move selectively said ring member for controlling the displacement of said swash plate on said transverse axis, a stationary swash plate disposed in said housing, said stationary swash plate being displaceable on a second transverse axis, an external control shaft operably connected to said stationary swash plate adapted to control the angular displacement thereof on said second transverse axis, a stationary valve member positioned in abutting relation with a portion of said block member, a rotatable valve member constrained for rotation with said input shaft and positioned in abutting relation with a second portion of said block member, a plurality of motor cylinders disposed in said block member positioned in operable relation with said stationary swash plate, a plurality of pump cylinders disposed in said block member positioned in operable relation with said rotatable swash plate, said valve members having high pressure and low pressure interconnecting fluid ducts communicating between said motor cylinders and pump cylinders through said fluid passages in phased relation, said control rod and said control shaft being actuatable for selectively shifting the angular displacement of each of said swash plates whereby the speed of said output shaft may be infinitely varied in a range from overdrive speed in one direction to overdrive speed in the opposite direction.

9. A variable speed hydromechanical transmission comprising, in combination, a stationary housing having a power input shaft and an output shaft, a block member having high pressure and low pressure fluid passages disposed in concentric relation with a portion of said input shaft and constrained for rotation with said output shaft, a rotatable swash plate disposed in said housing and constrained for rotation with said input shaft, said swash plate being displaceable on a transverse axis, an externally operable first control means positioned to control selectively the angular displacement of said swash plate on said axis, a stationary swash plate disposed in said housing, said stationary swash plate being displaceable on a second transverse axis, an externally operable second control means positioned to control selectively the angular displacement of said stationary swash plate, a stationary valve member positioned in cooperative relation with said block member, a rotatable valve member constrained for rotation with said input shaft and positioned in cooperative relation with said block member, a plurality of motor cylinders disposed in said block member positioned in operable relation with said stationary swash plate, a plurality of pump cylinders disposed in said block member positioned in operable relation with said rotatable swash plate, said valve members having high pressure and low pressure interconnecting fluid ducts communicating between said motor cylinders and pump cylinders through said fluid passages in phased relation, said first and second control means being actuatable for selectively shifting the angular displacement of each of said swash plates whereby the speed of said output shaft may be infinitely varied in a range from overdrive speed in one direction to overdrive speed in the opposite direction.

10. A variable speed hydromechanical transmission comprising, in combination, a stationary housing having an input shaft and an output shaft, a block member having high pressure and low pressure fluid passages disposed in concentric relation with a portion of said input shaft, a rotatable swash plate disposed in said housing and constrained for rotation with said input shaft, said swash plate being displaceable on a transverse axis, an externally operable first control means positioned to control selectively the angular displacement of said swash plate on said axis, a stationary swash plate disposed in said housing, said stationary swash plate being displaceable on a second transverse axis, an externally operable second control means positioned to control selectively the angular displacement of said stationary swash plate, a plurality of motor cylinders disposed in said block member positioned in operable relation with said stationary swash plate, a plurality of pump cylinders disposed in said block member positioned in operable relation with said rotatable swash plate, valve means adapted to communicate said motor cylinders with said pump cylinders through said fluid passages in phased relation, said first and second control means being actuatable for selectively shifting the angular displacement of each of said swash plates whereby the speed of said output shaft may be infinitely varied in a range from overdrive speed in one direction to overdrive speed in the opposite direction.

11. A variable speed hydromechanical transmission comprising, in combination, a stationary housing having an input shaft and an output shaft, a block member having high pressure and low pressure fluid passages therein constrained for rotation with said output shaft, a rotatable swash plate disposed in said housing and constrained for rotation with said input shaft, said swash plate being displaceable on a transverse axis, a stationary swash plate disposed in said housing, said stationary swash plate being displaceable on a second transverse axis, a plurality of motor cylinders disposed in said block member positioned in operable relation with said stationary swash plate, a plurality of pump cylinders disposed in said block member positioned in operable relation with said rotatable swash plate, valve means positioned to communicate said motor cylinders with said pump cylinders through said fluid passages in phased relation, and externally operable control means actuatable for selectively shifting the angular displacement of each of said swash plates whereby the speed of said output shaft may be infinitely varied in a range from overdrive speed in one direction to overdrive speed in the opposite direction.

12. A variable speed hydromechanical transmission comprising, in combination, a stationary housing having an input shaft and an output shaft, a block member disposed in said housing constrained for rotation with said output shaft, a rotatable swash plate disposed in said housing constrained for rotation with said input shaft, said swash plate being displaceable on a transverse axis, a stationary swash plate disposed in said housing, said stationary swash plate being displaceable on a second transverse axis, a plurality of motor cylinders disposed in said block member and positioned in operable relation with said stationary swash plate, a plurality of pump cylinders disposed in said block member positioned in operable realtion with said rotatable swash plate, fluid means positioned to communicate said motor cylinders with said pump cylinders in phased relation, and externally operable control means actuatable for selectively shifting the angular displacement of each of said swash plates on their respective axes whereby the speed of said output shaft may be infinitely varied in a range from overdrive speed in one direction to overdrive speed in the opposite direction.

13. A variable speed hydromechanical power transmission comprising a stationary housing having a power input shaft and a power output shaft disposed longitudinally therein, a block member constrained for rotation with said output shaft, a plurality of motor pistons longitudinally disposed in the outer peripheral portion of said block member in equilateral spaced relation, a plurality of pump pistons longitudinally disposed in the inner peripheral portion of said block member in equilateral spaced relation, a rotatable swash plate constrained for rotation with said input shaft in operative engagement with said pump pistons, a stationary swash plate positioned in operative engagement with said motor pistons, externally operable control means positioned to shift selectively the angular displacement of each of said swash plates independently of each other, a stationary valve member positioned in abutting relation with one end of said block member, a rotatable valve member constrained for rotation with said input shaft poistioned in abutting relation with the other end of said block member, and fluid passage means disposed in said block member in cooperative relation with said valve members for intercommunicating said pump and motor pistons in phased relation whereby appropriate shifting of the angular displacement of said swash plates varies the speed of said output shaft in a range from overdrive speed in one direction to overdrive speed in the other direction.

14. For a fluid power transmission having an input shaft and an output shaft, and a plurality of pump cylinders and motor cylinders interconnected in phased relation respectively actuated by first and second swash plates, a force compensating device for balancing axial thrust forces between said shafts, said device comprising a fluid pressure compartment between said shafts in force reactive relation, a small bore axially disposed in said input shaft having a small piston slidable therein forming a high pressure fluid chamber, a large bore axially disposed in said input shaft in coextensive relation with said small bore, a large piston slidable in said large bore connected to said small piston forming an intermediate fluid pressure chamber, said intermediate chamber being communicatively connected with said compartment and said high pressure chamber being communicatively connected with the high pressure fluid system in said transmission, a transverse duct in said input shaft communicatively connecting said small bore with said compartment, said duct being positioned in throttling valve relation with said small piston for replenishing fluid leakage losses from said compartment, and said small piston being urged by said high pressure fluid system in a direction to pressurize said compartment for producing a counter-reactive force sufficient to oppose the axial thrust forces between said shafts.

15. For a fluid power transmission having an input shaft and an output shaft, and a plurality of pump cylinders and motor cylinders interconnected in phased relation respectively cooperative with first and second swash plates, a force compensating device for reactively balancing axial thrust forces of said shafts, said device comprising a fluid pressure compartment between said shafts in hydraulic force reactive relation, a small bore axially disposed in said input shaft having a small piston slidable therein forming a high pressure fluid chamber, a large bore axially disposed in said input shaft in coextensive relation with said small bore, a large piston slidable in said large bore connected to said small piston forming an intermediate fluid pressure chamber, said intermediate chamber being communicatively connected with said compartment and said high pressure chamber being communicatively connected with the high pressure fluid system in said transmission whereby said small piston is urged by said high pressure fluid system in a direction to pressurize said compartment for producing a counter-reactive force sufficient to oppose the axial thrust forces on said shafts.

16. For a fluid power transmission having an input shaft and an output shaft, and a plurality of pump cylinders and motor cylinders interconnected in phased relation respectively cooperative with first and second swash plates, a force compensating device for reactively balancing axial thrust forces of said shafts, said device comprising a fluid pressure compartment between said shafts in hydraulic force reactive relation, a small bore disposed in one of said shafts having a small piston slidable therein forming a high pressure fluid chamber, a large bore disposed in coextensive relation with said small bore, a large piston slidable in said large bore connected to said small piston forming an intermediate fluid pressure chamber, said intermediate chamber being communicatively connected with said compartment and said high pressure chamber being communicatively connected with the high pressure fluid system in said transmission whereby said small piston is urged by said high pressure fluid system in a direction to pressurize said compartment for producing a counter-reactive force sufficient to oppose the axial thrust forces on said shafts.

17. For a fluid power transmission having an input shaft and an output shaft, and a plurality of pump cylinders and motor cylinders interconnected in phased relation respectively cooperative with first and second swash plates, a force compensating device for reactively balancing axial thrust forces of said shafts, said device comprising a fluid pressure compartment between said shafts in hydraulic force reactive relation, a small bore disposed in said device having a small piston slidable therein forming a high pressure fluid chamber, a large bore disposed in coextensive relation with said small bore, a large piston slidable in said large bore connected to said small piston forming an intermediate fluid pressure chamber, said intermediate chamber being communicatively connected with said compartment and said high pressure chamber being communicatively connected with the high pressure fluid system in said transmission whereby said small piston is urged by said high pressure fluid system in a direction to pressurize said compartment for producing a counter-reactive force sufficient to oppose the axial thrust forces on said shafts.

18. For a fluid power transmission having an input shaft and an output shaft, and a plurality of pump cylinders and motor cylinders interconnected in phased relation respectively cooperative with first and second swash plates, a force compensating device for reactively balancing axial thrust forces of said shafts, said device comprising a fluid pressure compartment formed by a first member connected to said output shaft and a second member connected to said input shaft in hydraulic force reactive relation, and a source of fluid pressure communicatively connected to said compartment whereby said compartment is pressurized for producing a counter-reactive force sufficient to oppose the axial thrust forces on said shafts.

19. A fluid power transmission having an input shaft and an output shaft, a plurality of pump cylinders positioned in operable relation with a rotatable swash plate and a plurality of motor cylinders positioned in operable relation with a stationary swash plate, a rotatable valve member and a stationary valve member positioned in operative relation for communicating fluid flow between said pump cylinders and motor cylinders, and externally accessible means for rotatively adjusting the position of said stationary valve member with respect to said stationary swash plate and externally accessible means for rotatively adjusting the position of said rotatable valve member with respect to said rotatable swash plate.

References Cited in the file of this patent
UNITED STATES PATENTS

| | | |
|---|---|---|
| 1,840,864 | Rayburn et al. | Jan. 12, 1932 |
| 2,784,554 | Badalini | Mar. 12, 1957 |
| 3,054,263 | Budzich et al. | Sept. 18, 1962 |